United States Patent
Shimizu et al.

(10) Patent No.: US 9,007,650 B2
(45) Date of Patent: Apr. 14, 2015

(54) IMAGE PROCESSING APPARATUS

(71) Applicant: Fuji Xerox Co., Ltd., Tokyo (JP)

(72) Inventors: Toru Shimizu, Yokohama (JP);
Shinsuke Sugi, Yokohama (JP); Shinya Takaishi, Yokohama (JP); Kota Matsuo, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/922,503

(22) Filed: Jun. 20, 2013

(65) Prior Publication Data

US 2014/0111817 A1 Apr. 24, 2014

(30) Foreign Application Priority Data

Oct. 22, 2012 (JP) ................. 2012-232880

(51) Int. Cl.
| | |
|---|---|
| G06K 15/10 | (2006.01) |
| H04N 1/00 | (2006.01) |
| B41J 2/165 | (2006.01) |
| B41J 2/21 | (2006.01) |

(52) U.S. Cl.
CPC ......... *H04N 1/00278* (2013.01); *B41J 2/16517* (2013.01); *B41J 2/2146* (2013.01)

(58) Field of Classification Search
USPC ............................ 358/1.13, 1.16, 1.9; 347/16
See application file for complete search history.

(56) References Cited

U.S. PATENT DOCUMENTS

| | | | | |
|---|---|---|---|---|
| 2008/0030535 | A1* | 2/2008 | Okawa ........................... | 347/16 |
| 2010/0245438 | A1 | 9/2010 | Furuhata et al. | |

FOREIGN PATENT DOCUMENTS

| | | |
|---|---|---|
| JP | 2005-289072 A | 10/2005 |
| JP | 2006-289748 A | 10/2006 |
| JP | 2007-144792 A | 6/2007 |
| JP | 2007-283644 A | 11/2007 |
| JP | 2010-221570 A | 10/2010 |

\* cited by examiner

*Primary Examiner* — Thomas Lett
(74) *Attorney, Agent, or Firm* — Sughrue Mion, PLLC

(57) ABSTRACT

An image processing apparatus includes: a reception portion that receives a first image; a selection portion that selects a head to perform pre-ejection; a generation portion that includes the selected head and generates patterns for detection of a transport speed of a sheet; an output portion that synthesizes the generated patterns with the received first image to output a second image on a sheet; a reading portion that reads the second image; an extraction portion that extracts the patterns from the read second image; and a control portion that analyzes the extracted patterns and controls the transport speed of the sheet at the output portion.

4 Claims, 8 Drawing Sheets

FIG. 8

| PATTERN ID | NUMBER OF DOTS | DOT POSITION (1) | DOT POSITION (2) | ... |
|---|---|---|---|---|
| | | | | |

810 820 830 840

800

IMAGE PROCESSING APPARATUS

CROSS-REFERENCE TO RELATED APPLICATIONS

This application is based on and claims priority under 35 U.S.C. 119 from Japanese Patent Application No. 2012-232880 filed on Oct. 22, 2012.

BACKGROUND

Technical Field

The present invention relates to an image processing apparatus.

SUMMARY

According to an aspect of the invention, An image processing apparatus includes: a reception portion that receives a first image; a selection portion that selects a head to perform pre-ejection; a generation portion that includes the selected head and generates patterns for detection of a transport speed of a sheet; an output portion that synthesizes the generated patterns with the received first image to output a second image on a sheet; a reading portion that reads the second image; an extraction portion that extracts the patterns from the read second image; and a control portion that analyzes the extracted patterns and controls the transport speed of the sheet at the output portion.

BRIEF DESCRIPTION OF THE DRAWINGS

Exemplary embodiment(s) of the present invention will be described in detail based on the following figures, wherein

FIG. 8 is a drawing showing an example of a data structure of a pattern table.

DETAILED DESCRIPTION

Hereinafter, an example of a preferred embodiment in realization of the invention will be described referring to the accompanying drawings.

Figure 1:
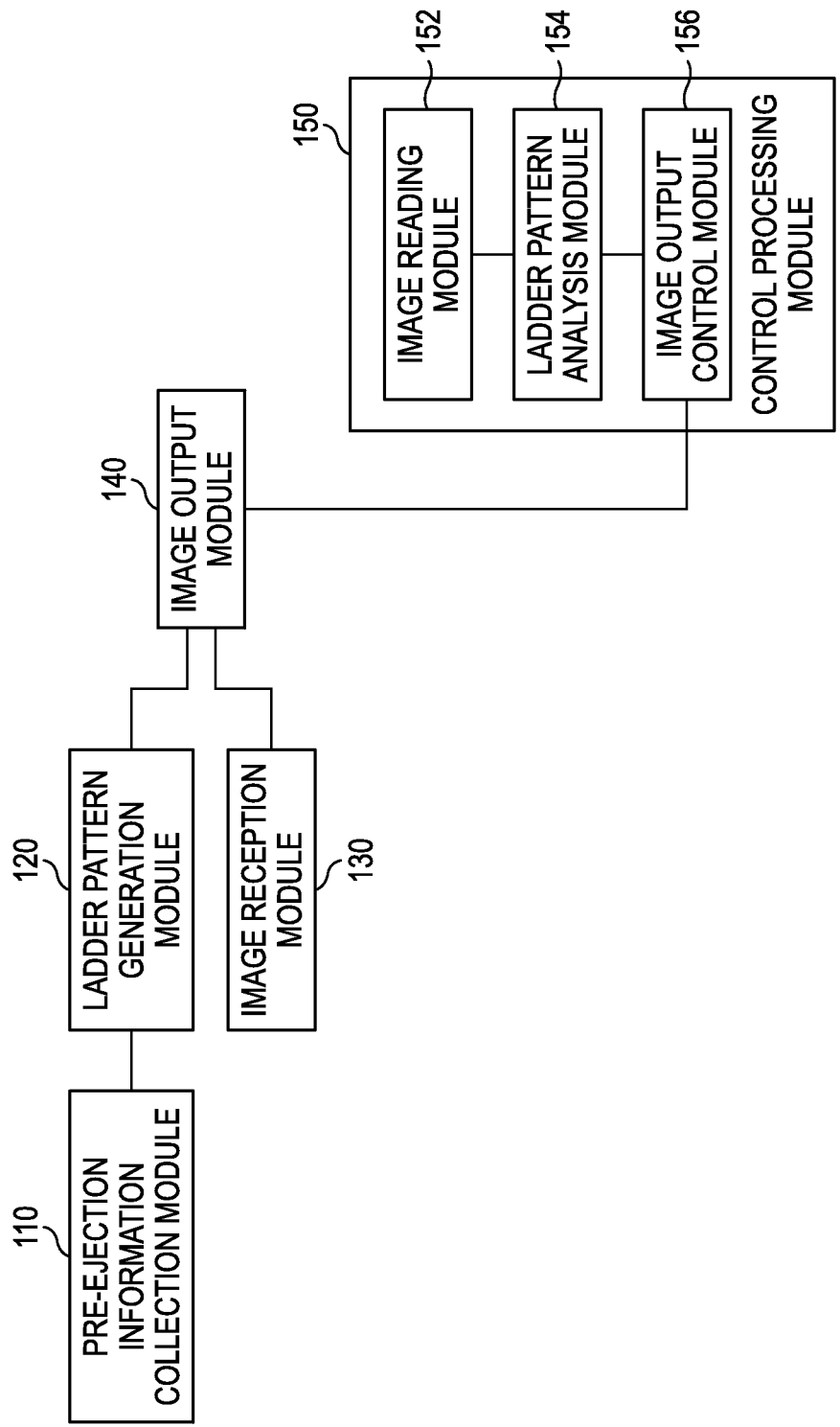
FIG. 1 is a diagram showing a conceptual module configuration with respect to a configuration example according to an exemplary embodiment of the invention.

FIG. 1 is an example of a conceptual module configuration with respect to a configuration example of an exemplary embodiment of the invention.

Here, a module generally represents a component such as software (computer program) or hardware capable of being logically divided. Accordingly, the module according to the present exemplary embodiment represents a module in a hardware configuration, as well as a module in a computer program. Thus, in the present exemplary embodiment, a computer program that functions as such a module (a program that causes a computer to execute respective processes, a program that causes a computer to function as respective portions, or a program that causes a computer to execute respective functions), a system and a method will be described together. Here, for ease of description, "store", "allow something to be stored" and equivalent expressions may be used. In a case where the embodiment corresponds to a computer program, these expressions mean to store something in a storage unit or to perform a control so that something is stored in a storage unit. Further, the module may correspond to a function one-to-one. However, in mounting, one module may be configured of one program, a plurality of modules may be configured of one program, or one module may be conversely configured of a plurality of programs. Further, a plurality of modules may be executed by one computer, or one module may be executed by a plurality of computers such as computers in a dispersed or parallel environment. Further, one module may include another module. Further, hereinafter, "connection" may be used in the case of a logical connection (data transmission and reception, instruction, reference relationship between data, or the like), as well as a physical connection. "Predetermined" means that something is determined before a target process, which means that something is determined before the procedure according to the present exemplary embodiment starts, and also means that something is determined according to situations or states at that time or up to that time, as long as the determination is performed before a target process even after the procedure according to the present exemplary embodiment starts. In a case where a plurality of "predetermined values" is present, the values may be different from each other, or two or more values (including all values) may be the same. Further, the expression of "in a case where something is A, do B" means "it is determined whether or not something is A, and in a case where it is determined that something is A, do B", which does not include a case where it is not necessary to determine whether or not something is A.

Further, a system or an apparatus may have a configuration in which a plurality of computers, hardware, apparatuses or the like is connected to each other by communication portion such as a network (including communication connection of one-to-one matching), or may have a configuration realized by a single computer, hardware, apparatus or the like. "Apparatus" and "system" may be used to have the same meaning. Here, "system" does not include a social "structure" (company system) that is no more than an artificial structure.

Further, for each process corresponding to each module, or for each of a plurality of processes performed in a module, target information is read from a storage unit, and after the process is performed, a process result is written into the storage unit. Thus, with respect to the reading from the storage unit before the process and the writing into the storage unit after the process, description thereof may be omitted. Here, the storage unit may include a hard disk, a random access memory (RAM), an external storage medium, a storage device using a communication line, a register in a central processing unit (CPU), or the like.

An image processing apparatus according to an exemplary embodiment of the invention is an apparatus (inkjet printer) in which an ink drop is ejected from a head to record an image, and includes a pre-ejection information collection module 110, a ladder pattern generation module 120, an image reception module 130, an image output module 140, and a control processing module 150, as shown in an example of FIG. 1.

The pre-ejection information collection module 110 is connected to the ladder pattern generation module 120. The pre-ejection information collection module 110 selects a head from which pre-ejection is to be performed. Here, the pre-ejection represents a process of ejecting ink at a predetermined timing to supply fresh ink into an unused nozzle, independently of image recording of image data, to thereby remove various causes that lead to ejection errors, such as air bubbles or dusts, or ink that is increased in viscosity due to evaporation of solvent and thus is not suitable for the image recording to maintain the state of being suitable for the image recording. As a method of pre-ejection, for example, there is a method of ejecting ink into an ink tray configured of an ink absorber or the like, but in the present exemplary embodiment, a method of performing direct pre-ejection on a sheet (recording medium) is used. Further, in the present exemplary embodiment, the pre-ejection is performed as a ladder pattern in an image to be printed. That is, even in a case where there is no difference between the width of the image and the width of the sheet, the ladder pattern (pre-ejection) is printed.

In order to select the "head from which pre-ejection is to be performed", the number of times that ink ejection is performed for each head in the image output module 140 is counted. Further, as a timing when a counter is reset, a predetermined time interval, or a predetermined printing unit (for example, every N sheets (N is an integer equal to or larger than 1), every printing instruction, every N lines, or the like) may be used. For example, a head of which the number of times of ink ejection is lower than a predetermined threshold value or is equal to or lower than the predetermined threshold value is selected. As the predetermined threshold value, a value determined from characteristics of the head, a value obtained by multiplying the number of times of the other heads (mode, average, norm, median, or the like) by the counted number (including 1), or the like is used.

Further, the pre-ejection information collection module 110 may select a head for each color. For example, the number of times of ejection is counted for each color of Y, M, C and K (yellow, magenta, cyan and black), and a color may be selected by the same method as described above. Here, the color selection is equivalent to head selection.

The ladder pattern generation module 120 is connected to the pre-ejection information collection module 110 and the image output module 140. The ladder pattern generation module 120 includes the head selected by the pre-ejection information collection module 110, and generates a pattern for detection of a transport speed of the sheet. The pattern for detection of the transport speed of the sheet is generally referred to as a ladder pattern. The ladder pattern is generated so that the head selected by the pre-ejection information collection module 110 is included as a head used for printing the ladder pattern. For example, the ladder pattern may be selected from plural types of predetermined ladder patterns, or may be generated according to a predetermined algorithm. The ladder pattern may be configured only of the head selected by the pre-ejection information collection module 110, or may be configured of a head other than the head selected by the pre-ejection information collection module 110. Further, in a case where the plural types of ladder patterns are generated, it is sufficient if the head selected by the pre-ejection information collection module 110 is included in the plural types of ladder patterns. As the ladder pattern to be generated, a pattern (figure in which points are apexes) such as a pentagon configured of points (dots, to be described later), a pattern including a predetermined color, or the like may be used. As the pattern, a figure having a two-dimensional characteristic (triangle, rectangle or the like), configured of plural points may be used. Here, the "figure having the characteristic" represents a shape in which the pattern is easily recognized by pattern matching or the like. Further, the pattern may be configured of plural colors.

Further, in a case where the pre-ejection information collection module 110 selects a color, the pattern may be generated so that the head of the color is more frequently included than the heads of the other colors. In this regard, the heads of the other colors may be 0. That is, a pattern configured of only the selected color may be generated.

Further, the ladder pattern generation module 120 may limit a position where the ladder pattern is printed in a predetermined region. For example, the ladder pattern may be printed in a predetermined range in a sub-scanning direction. That is, the ladder pattern may be arranged in the transport direction.

Further, the ladder pattern generation module 120 stores information relating to the generated pattern in a pattern table 800, for example. FIG. 8 is a drawing showing an example of a data structure of the pattern table 800. The pattern table 800 includes a pattern ID section 810, a dot number section 820, a dot position (1) section 830, a dot position (2) section 840, and the like. The pattern ID section 810 stores information (pattern ID) by which a pattern can be uniquely recognized in the present exemplary embodiment. The dot number section 820 stores the number of dots that form the pattern (the number of apexes). The dot position (1) section 830, the dot position (2) section 840 and the like are continued as many as the number of dots. The dot position (1) section 830 or the like stores the position (coordinates) of the dot in an image.

The image reception module 130 is connected to the image output module 140. The image reception module 130 receives an image and transmits the image to the image output module 140. Here, the image reception may include reading of an image using a scanner, a camera or the like, reception of an image from an external device through a communication line using a facsimile or the like, reading of an image stored in a hard disk (built into a computer, or connected through a network, for example), or the like. The image may be a binary image, or a multi-level image (including a color image). The received image may be one or plural. Further, the content of the image may include a document used in business, a pamphlet for commercial, a photo, or the like.

The image output module 140 is connected to the ladder pattern generation module 120, the image reception module 130, and an image output control module 156. The image output module 140 synthesizes the ladder pattern generated by the ladder pattern generation module 120 with the image received by the image reception module 130 and outputs the result. Here, the output refers to a so-called printing, which is to print an image including the ladder pattern on a sheet. The image output module 140 corresponds to an output device in an inkjet printer, and performs printing by ejection of an ink drop from the above-described head. Further, in the present exemplary embodiment, the printing of the ladder pattern refers to performing the pre-ejection.

The control processing module 150 includes an image reading module 152, a ladder pattern analysis module 154, and the image output control module 156.

The image reading module 152 is connected to the ladder pattern analysis module 154. The image reading module 152 reads the image output from the image output module 140.

The ladder pattern analysis module 154 is connected to the image reading module 152 and the image output control module 156. The ladder pattern analysis module 154 extracts the ladder pattern generated by the ladder pattern generation module 120 from the image read by the image reading module 152. As the extracting method, a so-called pattern matching method or the like may be employed. For example, the ladder pattern analysis module 154 extracts a pattern such as a pentagon configured of points, and a pattern formed of a predetermined color. Further, in a case where the position where the ladder pattern is printed is limited in the predetermined region, the extraction may be performed only within this range as a target. Further, referring to the pattern table 800, the ladder pattern may be extracted in the vicinity of the coordinates (within the radius of a predetermined distance around the coordinates).

The image output control module 156 is connected to the image output module 140 and the ladder pattern analysis module 154. The image output control module 156 analyzes the ladder pattern extracted by the ladder pattern analysis module 154 to control the transport speed of the sheet in the image output module 140. As the control method, any known control method may be used.

Further, the image output control module 156 may calculate a position determined using the positions of plural points that form the ladder pattern, and may control the transport speed of the sheet in the image output module 140 based on the positional relationship between the calculated plural patterns. The "position determined using the positions of the plural points that form the ladder pattern" refers to the center of the ladder pattern (the apexes of the figure), the center of gravity thereof, or the like, for example. Further, with respect to the "positional relationship between the calculated plural patterns", in a case where the positional relationship of the ladder patterns that are synthesized with the image and the positional relationship of the ladder patterns that are actually printed are different from each other, a control of decreasing or increasing the transport speed of the sheet is performed. For example, in a case where the distance between two ladder patterns is long, a control of increasing the transport speed of the sheet is performed. Here, the distance calculated referring to the pattern table 800 and the distance between the ladder patterns extracted by the ladder pattern analysis module 154 are compared with each other.

Figure 2:
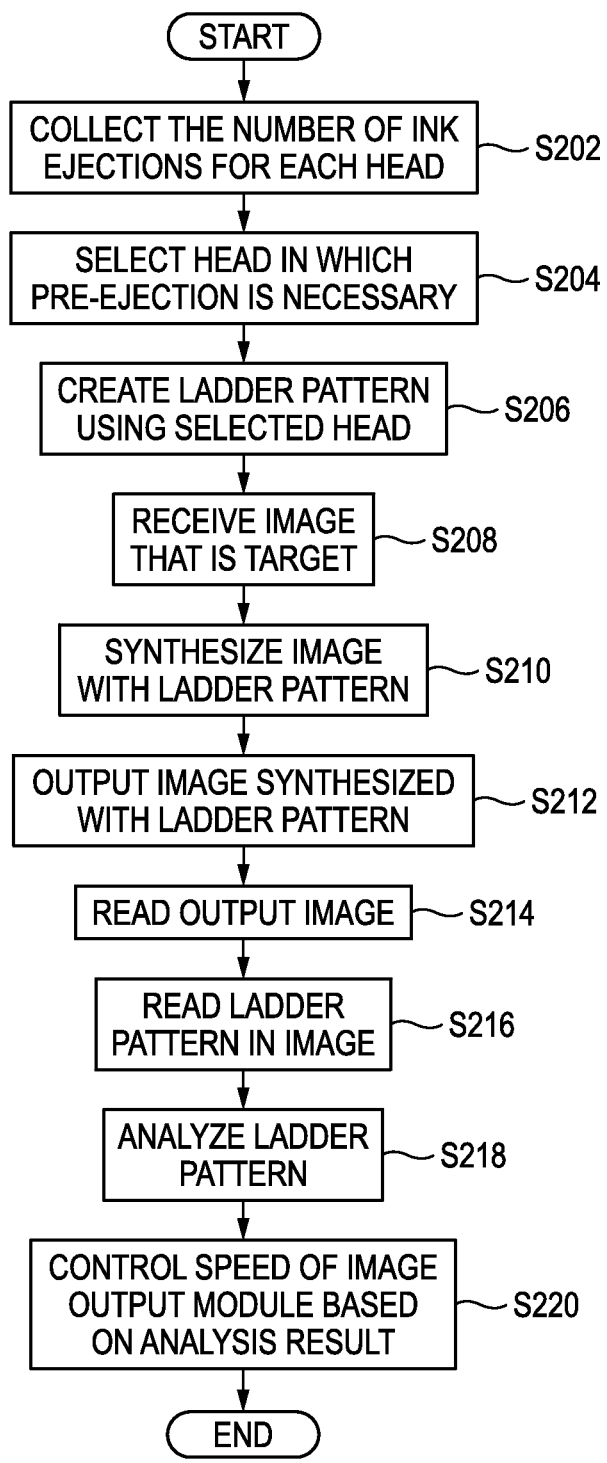
FIG. 2 is a flowchart showing a processing example according to an exemplary embodiment of the invention.

FIG. 2 is a flowchart showing a processing example according to the present exemplary embodiment.

In step S202, the pre-ejection information collection module 110 collects the number of ink ejections for each head.

In step S204, the pre-ejection information collection module 110 selects a head in which pre-ejection is necessary.

In step S206, the ladder pattern generation module 120 creates a ladder pattern using the selected head.

In step S208, the image reception module 130 receives an image that is a target.

In step S210, the image output module 140 synthesizes the image with the ladder pattern.

In step S212, the image output module 140 outputs the image synthesized with the ladder pattern.

In step S214, the image reading module 152 reads the output image.

In step S216, the ladder pattern analysis module 154 reads the ladder pattern in the image.

In step S218, the ladder pattern analysis module 154 analyzes the ladder pattern.

In step S220, the image output control module 156 controls the speed of the image output module 140 based on the analysis result.

Figure 3:
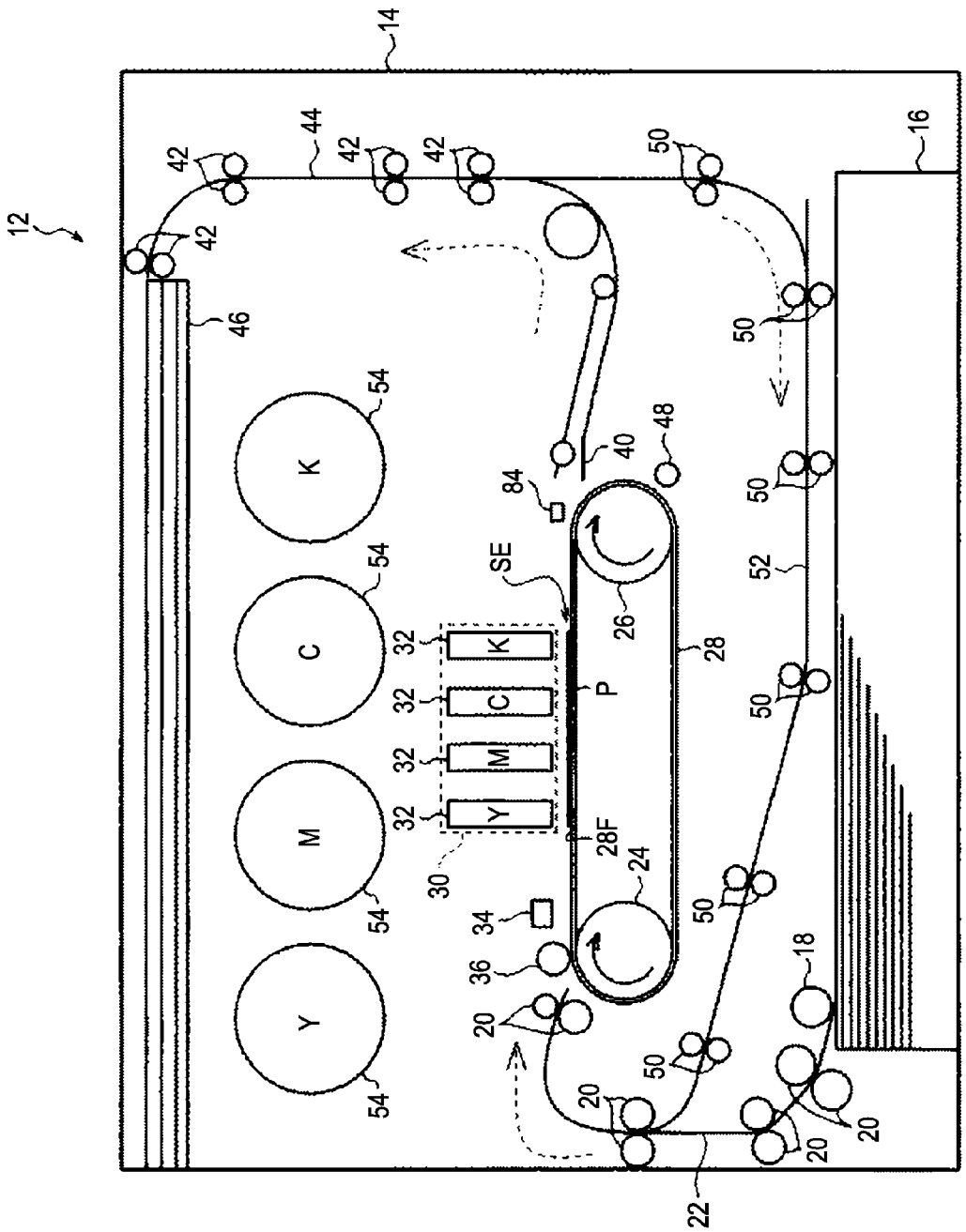
FIG. 3 is a drawing showing an overall configuration of an image processing apparatus that realizes an exemplary embodiment of the invention.

FIG. 3 is a drawing showing an overall configuration of an image processing apparatus that realizes an exemplary embodiment of the invention. Paper feed portion (paper feed tray) 16 is provided in a lower part of a casing 14 of an inkjet recording apparatus 12, and sheets P that are stacked in the paper feed portion 16 may be extracted by a pickup roller 18 one by one. The extracted sheet P is transported by plural transport roller pairs 20 that form a predetermined transport path 22. Hereinafter, the simple "transport direction" represents the transport direction of the sheet P that is a recording medium, and "upstream" and "downstream" represent upstream and downstream in the transport direction, respectively.

An endless transport belt 28 that is wound over a drive roller 24 and a driven roller 26, both being transport portion, is disposed above the paper feed portion 16. A recording head array 30 is disposed above the transport belt 28, and faces a flat portion 28F of the transport belt 28. The faced region corresponds to an ejection region SE where an ink drop is ejected from the recording head array 30. The sheet P that is transported through the transport path 22 is held by the transport belt 28 to reach the ejection region SE, and an ink drop according to image information from the recording head array 30 is attached thereto in a state where the sheet P faces the recording head array 30.

Further, by transporting the sheet P in the state of being held by the transport belt 28, it is possible to pass the sheet P through the ejection region SE to perform image recording. In this regard, by circulating the sheet P in the state of being held by the transport belt 28, it is possible to pass the sheet P through the ejection region SE plural times to perform so-called multi-path image recording.

A Portion for transporting the sheet P that is the recording medium to the recording head array 30 is not limited to the transport belt 28. For example, a configuration may be used in which the recording medium (sheet P) is adsorbed and held on the outer circumference of a transport roller formed in a cylindrical shape or a columnar shape and the transport roller is rotated. Here, if the transport belt 28 is used as in the present exemplary embodiment, the flat portion 28F is formed, and thus, it is possible to arrange the recording head array 30 to correspond to the flat portion 28F, which is preferable.

In the present exemplary embodiment, the recording head array 30 has a long valid recording region that is equal to or larger than the width of the sheet P (length in a direction orthogonal to the transport direction), and four inkjet recording heads 32 corresponding to respective four colors of yellow (Y), magenta (M), cyan (C) and black (K) are arranged along the transport direction, so that a full color image can be recorded. A method of ejecting an ink drop in each inkjet recording head 32 is not particularly limited, and a known method such as a so-called thermal method or a piezoelectric method may be applied.

Each inkjet recording head 32 is configured so that an operation thereof is controlled by a recording head controller. The recording head controller determines an ejection timing of an ink drop or an ink ejection port (nozzle) to be used according to image information, for example, and transmits a driving signal to the inkjet recording head 32. The recording head array 30 may be formed not to move in the direction orthogonal to the transport direction, but if the recording head array 30 is configured to move as necessary, it is possible to record an image with higher resolution in the multi-path image recording, or to prevent errors of the inkjet recording head 32 from being reflected to the recording result.

Although not shown, a maintenance unit that moves into a gap between the recording head array 30 and the transport belt 28 to perform a predetermined maintenance operation (vacuum forming, dummy jet, wiping, capping or the like) is arranged in the vicinity (on at least one side of the upstream side and the downstream side in the transport direction) of the recording head array 30.

On the other hand, a line sensor 84 configured of a CCD is arranged on the downstream side of the recording head array 30 to be capable of capturing the image recorded on the sheet P by the recording head array 30. The line sensor 84 has a long valid imaging region that is equal to or larger than the width of the sheet P (length in the direction orthogonal to the transport direction), and is capable of reading a full color image. As the line sensor 84, a line sensor having a resolution of a captured image that is about four times the resolution of the image recording performed by the inkjet recording head 32 (about twice the nozzle resolution) is applied. Here, the CCD line sensor is applied as the line sensor 84, but this is not limitative, and other solid-state image sensing devices such as a CMOS image sensor may be used. Further, the line sensor 84 is configured so that an operation thereof is controlled by a sensor controller.

Further, although not shown, a charging roller connected to a power source is arranged on the upstream side of the recording head array 30. The charging roller is driven with the transport belt 28 and the sheet P being interposed between the charging roller and the drive roller 24, and is configured to move between a pressing position where the sheet P is pressed against the transport belt 28 and a separation position that is separated from the transport belt 28. At the pressing position, electric charges are given to the sheet P, and thus, the sheet P is electrostatically adsorbed to the transport belt 28.

A separation plate 40 formed of an aluminum plate or the like is arranged on a further downstream side than the line sensor 84 of the recording head array 30 to separate the sheet P from the transport belt 28. The separated sheet P is transported by plural discharge roller pairs 42 that form an outlet path 44 on the downstream side of the separation plate 40, and is discharged to paper discharge portion 46 that is provided in an upper part of the casing 14.

A cleaning roller 48 capable of causing the transport belt 28 to be pinched between the drive roller 24 and the cleaning roller 48 is arranged under the separation plate 40 to clean the surface of the transport belt 28.

A reversing path 52 configured of plural reversing roller pairs 50 is provided between the paper feed portion 16 and the transport belt 28, and thus, the sheet P on which image recording is performed on one side thereof is reversed to be held onto the transport belt 28. Thus, it is possible to easily perform image recording on both sides of the sheet P.

Ink tanks 54 that accumulate respective inks of four colors are provided between the transport belt 28 and the paper discharge portion 46. The ink in each ink tank 54 is supplied to the recording head array 30 by an ink supply line (not shown). As the ink, various known inks such as a water based ink, an oil based ink, or a solvent based ink may be used.

Next, a configuration of the inkjet recording head 32 according to the present exemplary embodiment will be described.

Figure 4:
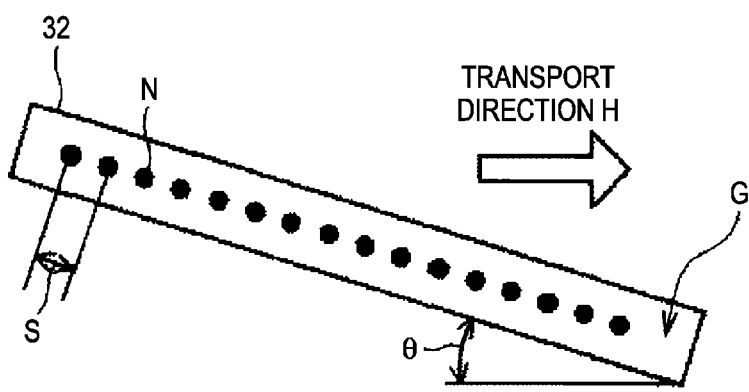
FIG. 4 is a drawing showing a configuration example of an inkjet recording head of a one-dimensional array.

As shown in FIG. 4, the inkjet recording head 32 of each color includes a nozzle group G in which plural nozzles N that respectively eject ink drops for image recording are linearly arranged in a predetermined direction with a uniform interval (pitch) S. The inkjet recording head 32 is arranged to have an inclination angle θ with respect to the transport direction. Here, the interval S, the inclination angle θ and the number of nozzles are examples for notation, and the number is not limited to a value shown in the figure.

Figure 5:
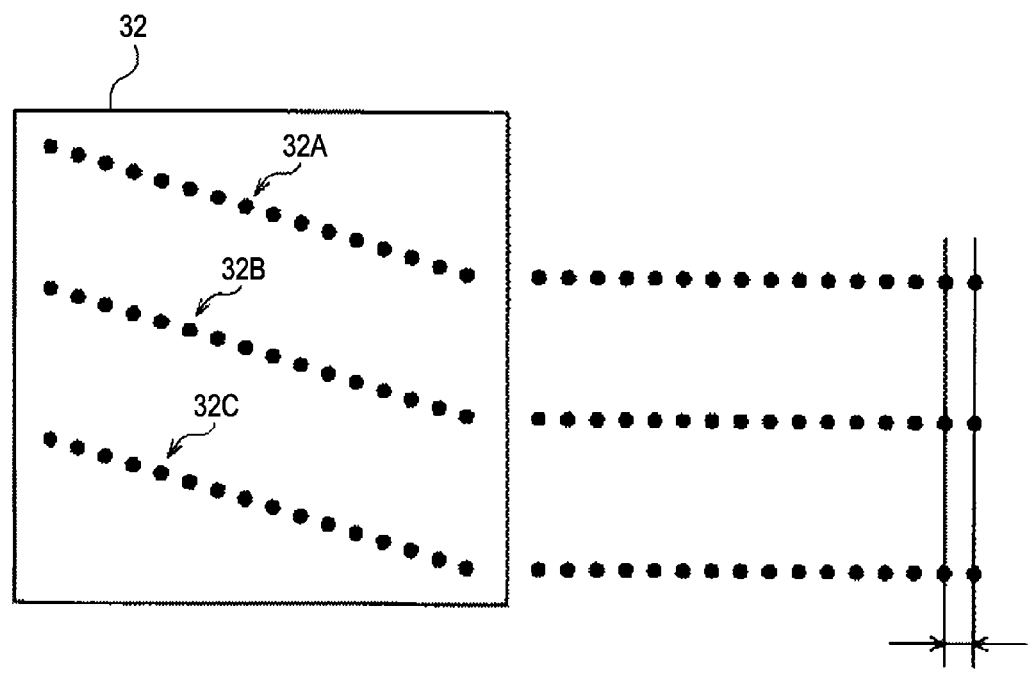
FIG. 5 is a drawing showing a configuration example of an inkjet recording head of a two-dimensional array.

Further, in the present exemplary embodiment, in order to adjust an image recording timing as described in detail below, the inkjet recording head 32 having nozzles N of a two-dimensional array shown in an example in FIG. 5 may be mounted. As shown in the example in FIG. 5, in the inkjet recording head 32, plural (three in the example in FIG. 5) nozzle groups G that are linearly arranged as in the example shown in FIG. 4 are provided in a direction transverse to the array direction of the nozzles N. That is, plural head units 32A, 32B and 32C that have the nozzle group G in which the plural nozzles N are linearly arranged in the predetermined direction at the uniform interval (pitch) S are arranged not to be overlapped with each other in a transport direction H of the nozzle groups G arranged in the adjacent head units. The head units 32A to 32C have the same specification, but when an individual head unit is described hereinafter, the inkjet recording head 32 may be distinctively denoted as one of the head units 32A to 32C for ease of description.

Figure 6:
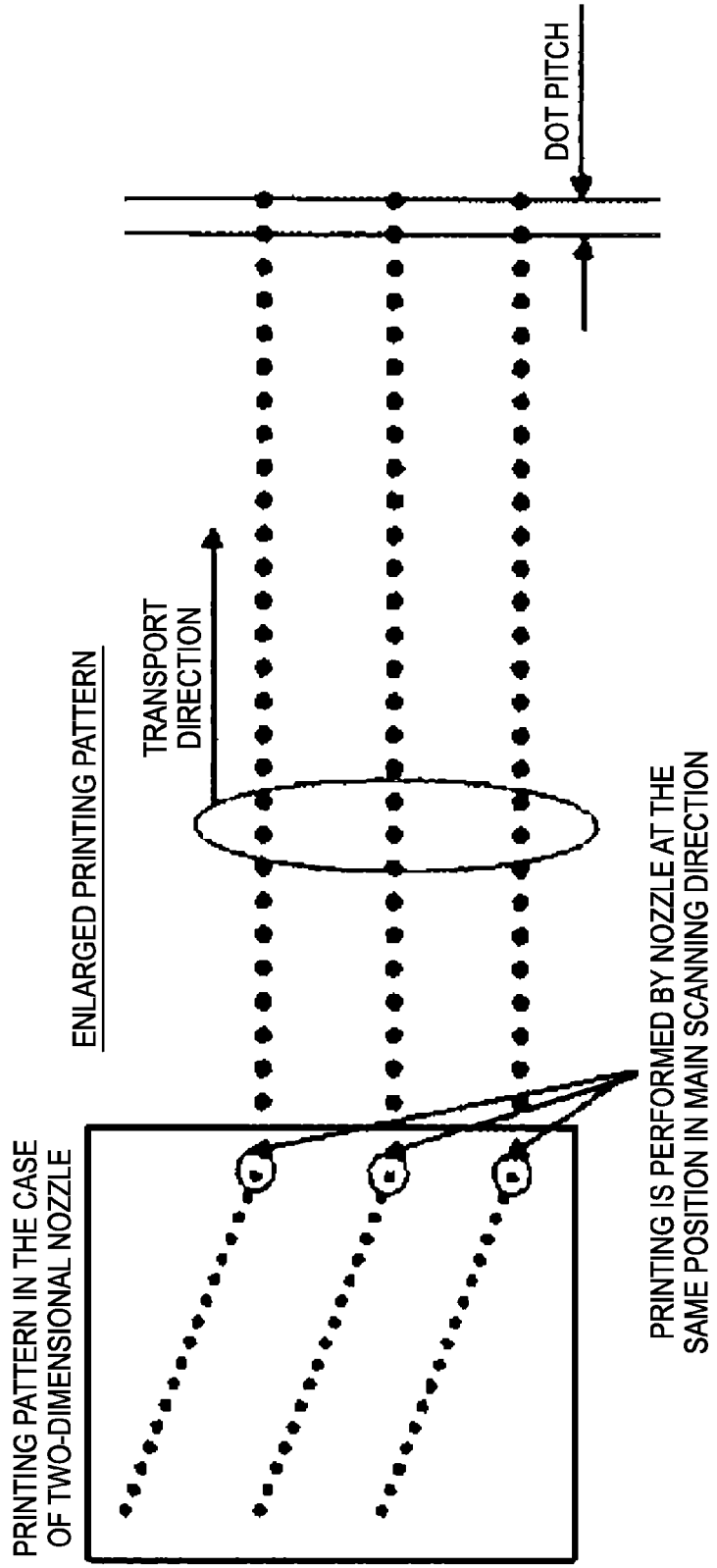
FIG. 6 is a drawing showing an example of a measurement process of test printing with respect to an inkjet recording head of a two-dimensional array.

FIG. 6 is a drawing showing an example of a measurement process of test printing with respect to an inkjet recording head of a two-dimensional array.

As detection of the transport speed (that may include detection of a variation characteristic of the transport speed), ladder pattern printing that is test printing shown in the example in FIG. 6 is performed, and is measured for calculation.

In the case of the inkjet recording head 32 having the nozzles N of the two-dimensional array (see FIG. 5), as shown in the example in FIG. 6, printing is performed at a uniform interval (dot pitch) by the nozzles N at the same positions in a main scanning direction that is the direction transverse to the transport direction. By measuring the printed dot intervals, line interval irregularity due to a test pattern (dots) corresponding to variation of the transport speed is detected. That is, in a case where the variation of the transport speed is present, the printed dot intervals show a periodic difference in the transport direction. Thus, as distance distribution of the intervals in the transport direction is measured, the periodic distance distribution corresponds to the variation characteristic. Accordingly, by measuring the intervals of the ladder pattern printed by the nozzles N for each color and detecting the transport speed variation, it is possible to detect the variation characteristic and the phase of each head. In this regard, in the case of the figure having the above-mentioned two-dimensional characteristic as the ladder pattern, the same process may be performed. That is, the interval between ladder patterns corresponds to the dot interval.

The image output control module 156 performs forward and back control according to the detected variation characteristic and phase of each head.

Next, the processes in the ladder pattern analysis module 154 and the image output control module 156 will be described.

Figure 7:
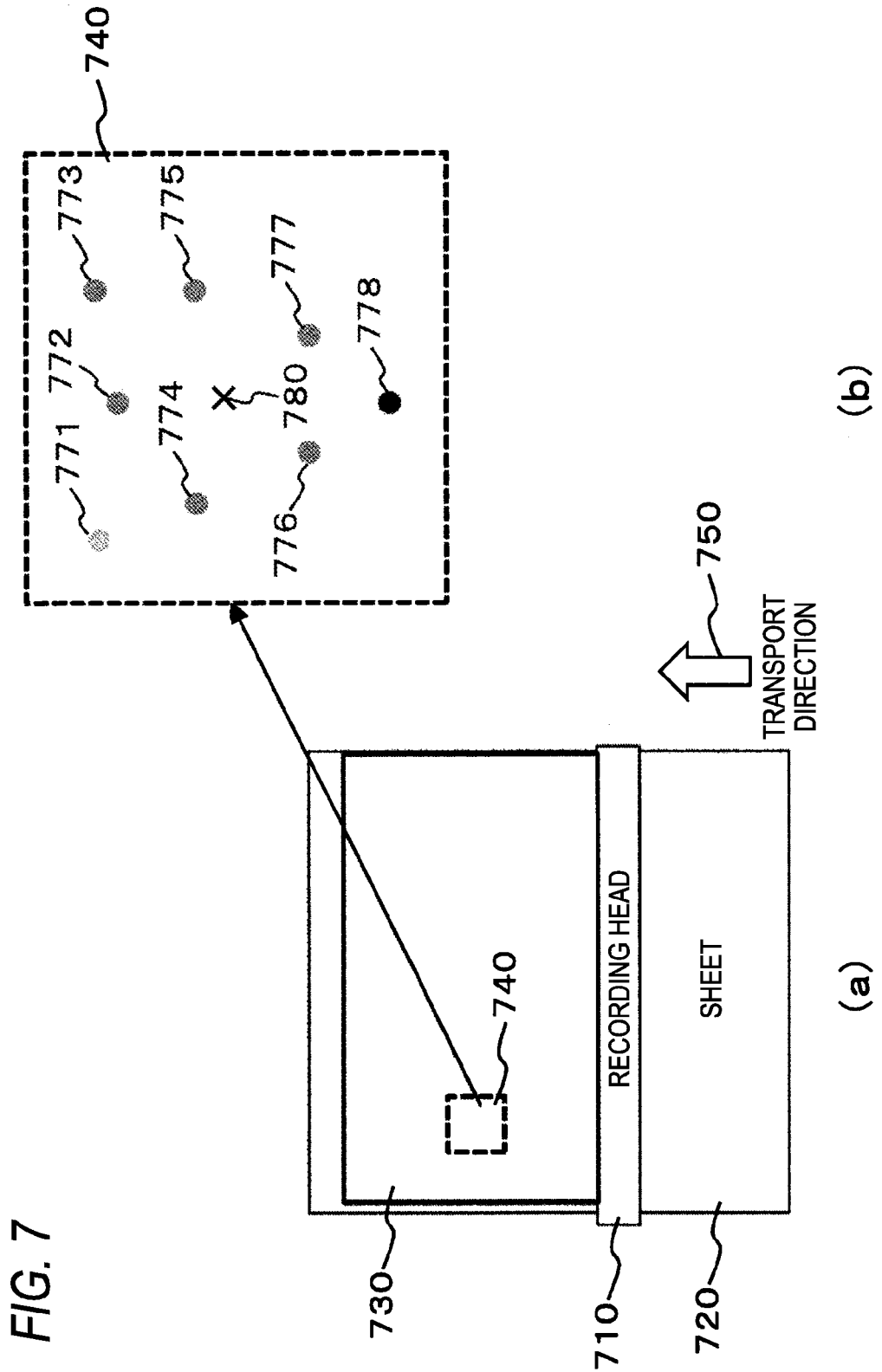
FIG. 7 is a drawing showing a process example according to an exemplary embodiment of the invention.

FIG. 7 is a diagram showing a process example according to an exemplary embodiment of the invention. In printing an image onto a sheet 720, in an example of part (a) of FIG. 7, a direction from down to up corresponds to an advancing direction 750 of the sheet, and a portion (sheet (where image recording is completed) 730) is shown where an image is printed by a recording head 710 while the sheet 720 is being transported. For example, a ladder pattern as shown in an example of part (b) of FIG. 7 is printed in a region 740. That is, in addition to a dot (Y) 771 printed with yellow, a dot (M) 773 printed with magenta and a dot (B) 778 printed with black, a pentagonal ladder pattern formed by a dot (C) 772, a dot (C) 775, a dot (C) 777, a dot (C) 776 and a dot (C) 774 that are printed with cyan is present in the region 740 as the ladder pattern. The ladder pattern analysis module 154 extracts this ladder pattern. Further, the image output control module 156 calculates a center of gravity 780 of the pentagonal pattern.

Then, another ladder pattern printed in a sub-scanning direction (transport direction) is extracted, and a center of gravity thereof is calculated. Then, a distance A between the centers of gravity is calculated. Further, a distance B between the original ladder patterns is calculated referring to the pattern table 800. Then, the two distances are compared with each other, and the image output module 140 is controlled according to the comparison result. That is, in a case where the distance A is larger than the distance B, the transport speed may be decreased, and in a case where the distance A is smaller than the distance B, the transport speed may be increased.

Figure 9:
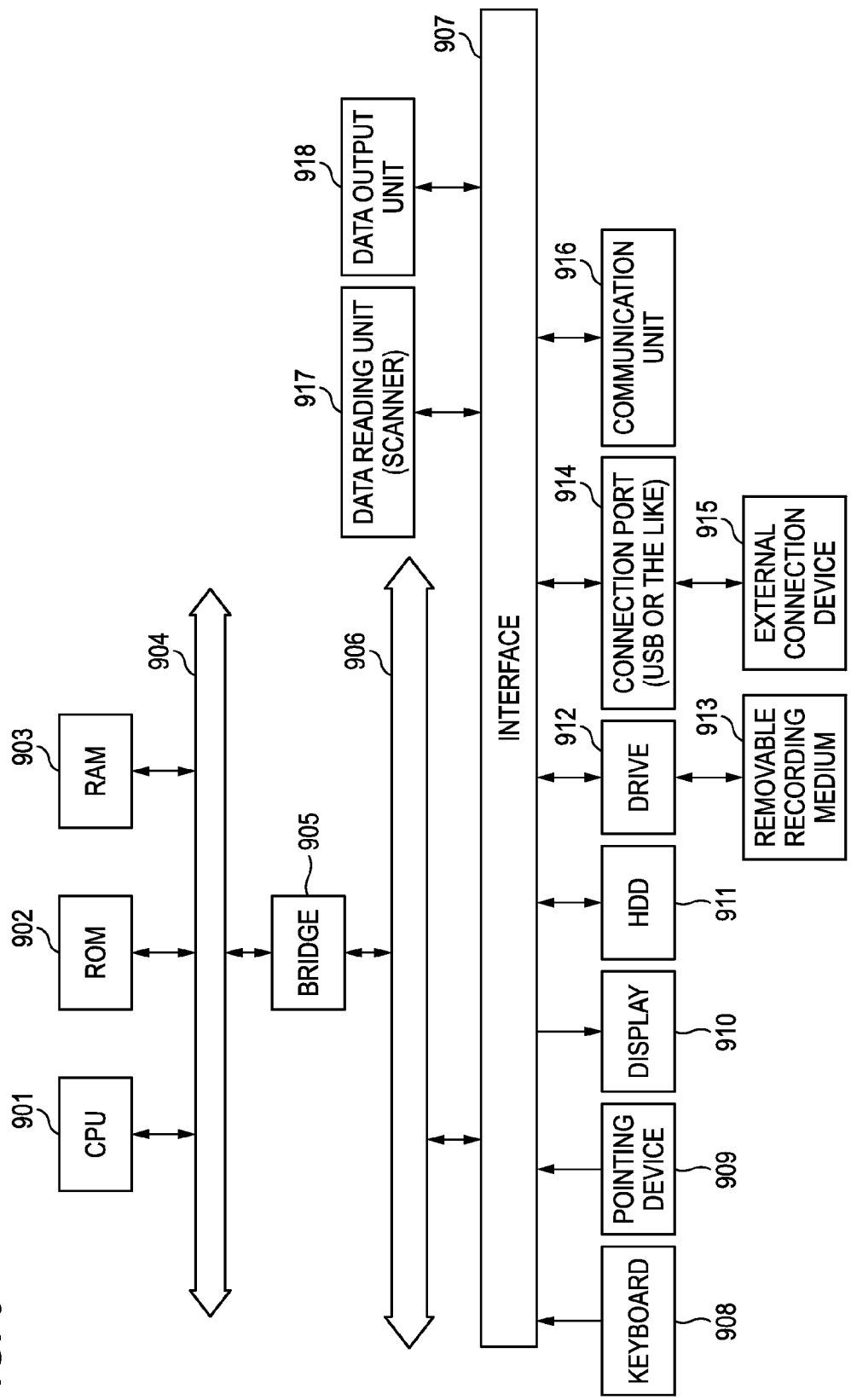
FIG. 9 is a block diagram showing an example of a hardware configuration of a computer that realizes an exemplary embodiment of the invention.

An example of a hardware configuration of the image processing apparatus according to the present exemplary embodiment will be described referring to FIG. 9. The configuration shown in FIG. 9 is configured of a personal computer (PC) or the like, for example, which shows an example of a hardware configuration that includes a data reading section 917 such as scanner and a data output section 918 such as a printer.

A central processing unit (CPU) 901 is a control section that executes processes according to a computer program in which execution sequences of the various modules described in the above exemplary embodiment are written, that is, the various modules including the pre-ejection information collection module 110, the ladder pattern generation module 120, the image reception module 130, the image output module 140, the control processing module 150, the image reading module 152, the ladder pattern analysis module 154 and the image output control module 156.

A read only memory (ROM) 902 stores a program, an operational parameter or the like used by the CPU 901. A random access memory (RAM) 903 stores a program used to execute the CPU 901, a parameter that appropriately varies in the execution, or the like. These components are connected to each other through a host bus 904 configured of a CPU bus and the like.

The host bus 904 is connected to an external bus 906 such as a peripheral component interconnect/interface (PCI) bus through a bridge 905.

A keyboard 908 and a pointing device 909 such as a mouse are input devices that are operated by an operator. A display 910 such as a liquid crystal display device and a cathode ray tube (CRT) displays various information as text or image information.

A hard disk drive (HDD) 911 includes a built-in hard disk, and drives the hard disk to record or reproduce a program or information executed by the CPU 901. An image that is an output target, a ladder pattern or the like is stored in the hard disk. Further, various computer programs such as other various data processing programs are stored in the hard disk.

A drive 912 reads data or a program recorded in a removable recording medium 913 such as a magnetic disc, an optical disc, a magneto-optical disc or a semiconductor memory that is mounted, and supplies the data or program to the RAM 903 connected thereto through an interface 907, an external bus 906, the bridge 905 and the host bus 904. The removable recording medium 913 may be used as the same data recording region as the hard disk.

A connection port 914 is a port to which an external connection device 915 is connected, and includes a connection unit such as a USB or IEEE 1394. The connection port 914 is connected to the CPU 901 or the like through the interface 907, the external bus 906, the bridge 905, the host bus 904 and the like. A communication unit 916 is connected to a communication line to execute a data communication process with the outside. A data reading unit 917 is a scanner, for example, and executes a document reading process. A data output unit 918 is a printer, for example, and executes a document data output process.

The hardware configuration of the image processing apparatus shown in FIG. 9 is a configuration example, and the present embodiment is not limited to the configuration shown in FIG. 9, and any configuration that is capable of executing the module described in the present embodiment may be used. For example, a part of the module may be configured of dedicated hardware (for example, application specific integrated circuit (ASIC) or the like), and the other part of the module may be installed in an external system to be connected by a communication line. Further, the plural systems as shown in FIG. 9 may be connected to each other by a communication line to be cooperatively operated. Further, the module may be assembled in a copier, a facsimile, a scanner, a printer or a multifunction machine (image processing apparatus having at least two functions of the scanner, the printer, the copier, the facsimile and the like).

The above-mentioned program may be stored in the recording medium for provision, or may be provided by the communication. In this case, for example, with respect to the above-mentioned program, a "computer-readable recording medium on which the program is recorded" may be understood as an aspect of the invention.

The "computer-readable recording medium on which the program is recorded" represents a computer-readable recording medium on which the program is recorded, which is used for installation and execution of the program, distribution of the program, or the like.

Here, for example, the recording medium includes a digital versatile disk (DVD) such as "DVD-R, DVD-RW, DVD-RAM or the like" that are standards established by the DVD Forum or "DVD+R, DVD+RW or the like" that are established as DVD+RW, a compact disc (CD) such as a compact disc read-only memory (CD-ROM), CD-Recordable (CD-R) or CD-Rewritable (CD-RW), Blu-ray Disc (registered trademark), a magneto-optical disc (MO), a flexible disc (FD), a magnetic tape, a hard disk, a read-only memory (ROM), an electrically erasable programmable read-only memory (EE-PROM (registered trademark)), a flash memory, a random access memory (RAM), a secure digital (SD) memory card, or the like.

Further, the above-mentioned program or a part thereof may be recorded on the recording medium for maintenance or distribution. Further, the above-mentioned program or the part thereof may be transmitted by communication, for example, by a transmission medium such as a wired network used in a local area network (LAN), a metropolitan area network (MAN), a wide area network (WAN), the Internet, an intranet, an extranet or the like, a wireless communication network, or a combination of the wired network and the wireless communication network, or may be carried on a carrier wave.

Further, the above-mentioned program may be a part of a different program, or may be recorded on a recording medium together with a separate program. Further, the above-mentioned program may be dividedly recorded on plural recording mediums. Further, the above-mentioned program may be recorded in any form as long as it is in a restorable form such as compression or encoding.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a reception portion configured to receive a first image;
   a selection portion configured to select a head to perform pre-ejection;
   a generation portion configured to include the selected head and generate patterns for detection of a transport speed of a sheet, the patterns each configured of a plurality of points;
   an output portion configured to synthesize the generated patterns with the received first image to output a second image on a sheet;
   a reading portion configured to read the second image;
   an extraction portion configured to extract the patterns from the read second image; and
   a control portion configured to analyze the extracted patterns and control the transport speed of the sheet at the output portion.

2. The image processing apparatus according to claim 1, wherein the generation portion is configured to generate the patterns including a predetermined color, and
   wherein the extraction portion is configured to extract the patterns including the color.

3. The image processing apparatus according to claim 1, wherein the generation portion is configured to store information relating to the patterns in a pattern table.

4. The image processing apparatus according to claim 1, wherein the control portion is configured to calculate a position determined using positions of the plurality of points of each pattern, and control the transport speed of the sheet at the output portion based on a positional relationship of the calculated positions between the patterns.

* * * * *